(12) United States Patent
Xiao et al.

(10) Patent No.: US 11,242,075 B2
(45) Date of Patent: Feb. 8, 2022

(54) CONNECTION STRUCTURE AND SYSTEM OF INTEGRATED BRAKE DEVICE FOR RAIL VEHICLE

(71) Applicant: MEISHAN CRRC BRAKE SCIENCE & TECHNOLOGY CO., LTD., Sichuan (CN)

(72) Inventors: Bali Xiao, Sichuan (CN); Keming Li, Sichuan (CN); Chao Lv, Sichuan (CN); Yanfei Shen, Sichuan (CN); Lei Xie, Sichuan (CN); Hong An, Sichuan (CN); Weiyuan Xiao, Sichuan (CN); Chen Xiao, Sichuan (CN); Yi Liu, Sichuan (CN); Jianping Yang, Sichuan (CN); Jianhong Shen, Sichuan (CN); Yu Tian, Sichuan (CN); Kaien Wang, Sichuan (CN); Yu Zhu, Sichuan (CN); Baohua Liu, Sichuan (CN); Wenjun Liu, Sichuan (CN); Bo Ning, Sichuan (CN); Hai Xu, Sichuan (CN); Dongfang Ou, Sichuan (CN); Moukui Li, Sichuan (CN)

(73) Assignee: MEISHAN CRRC BRAKE SCIENCE & TECHNOLOGY CO., LTD., Sichuan (CN)

( * ) Notice: Subject to any disclaimer, the term of this patent is extended or adjusted under 35 U.S.C. 154(b) by 289 days.

(21) Appl. No.: 16/623,731

(22) PCT Filed: Jan. 8, 2018

(86) PCT No.: PCT/CN2018/071795
§ 371 (c)(1),
(2) Date: Dec. 17, 2019

(87) PCT Pub. No.: WO2019/024439
PCT Pub. Date: Feb. 7, 2019

(65) Prior Publication Data
US 2020/0369301 A1    Nov. 26, 2020

(30) Foreign Application Priority Data

Aug. 3, 2017    (CN) .......................... 201710654815.5

(51) Int. Cl.
*B61H 13/20*    (2006.01)
*B60T 13/24*    (2006.01)
(Continued)

(52) U.S. Cl.
CPC .............. *B61H 13/20* (2013.01); *B60T 13/24* (2013.01); *B60T 15/021* (2013.01);
(Continued)

(58) Field of Classification Search
CPC ......... B61H 11/00; B61H 13/38; B60T 13/20; B60T 13/24; B60T 15/021; B60T 17/002; B60T 17/04; B60T 17/06
See application file for complete search history.

(56) References Cited

U.S. PATENT DOCUMENTS 4,817,536 A    4/1989    Cripe et al.

FOREIGN PATENT DOCUMENTS

CA    2812341 A1 *    9/2014    .............. B60T 17/04
CN    2574956 Y        9/2003
(Continued)

*Primary Examiner* — Melanie Torres Williams
(74) *Attorney, Agent, or Firm* — Novick, Kim & Lee, PLLC; Allen Xue

(57) ABSTRACT

Provided are a connection structure and system of an integrated brake device for a rail vehicle. The connection structure of an integrated brake device for a rail vehicle includes a brake valve, a dust collector, an intermediate body, an air cylinder, a support assembly and a connection assembly. The intermediate body is of a plate-type structure, the brake valve and the dust collector are mounted on one side of the intermediate body, the air cylinder is connected to the intermediate body by means of the connection assembly, the air cylinder is mounted on the other side of the (Continued)

intermediate body, and the support assembly is located between the air cylinder and the intermediate body. The connection structure of an integrated brake device for a rail vehicle has a simple and compact structure and saves on space. Brake components are integrated on the intermediate body, and the connections between the brake components and between the whole integrated brake device and an external mounting base are all secure and reliable.

18 Claims, 6 Drawing Sheets

(51) Int. Cl.
*B60T 15/02* (2006.01)
*B60T 17/00* (2006.01)
*B60T 17/04* (2006.01)
*B60T 17/06* (2006.01)
*B61H 13/38* (2006.01)

(52) U.S. Cl.
CPC ............ *B60T 17/002* (2013.01); *B60T 17/04* (2013.01); *B60T 17/06* (2013.01); *B61H 13/38* (2013.01)

(56) References Cited

FOREIGN PATENT DOCUMENTS

| CN | 201961334 U | | 9/2011 | |
| CN | 202953012 U | | 5/2013 | |
| CN | 106427974 A | * | 2/2017 | |
| CN | 106945621 A | * | 7/2017 | |
| CN | 207029151 U | | 2/2018 | |
| DE | 102006044171 A | * | 3/2008 | ............. B60T 17/06 |
| KR | 20120006191 A | * | 1/2012 | |
| KR | 101546947 B1 | * | 8/2015 | |

* cited by examiner

US 11,242,075 B2

CONNECTION STRUCTURE AND SYSTEM OF INTEGRATED BRAKE DEVICE FOR RAIL VEHICLE

CROSS REFERENCES OF RELATED APPLICATIONS

The application is a 371 of PCT/CN2018/071795 filed on Jan. 8, 2018, which claims priority of Chinese patent applicant No. CN201710654815.5 titled "Connection Structure and System of Integrated Brake Device for Rail Vehicle" filed to the Patent Office of the People's Republic of China on Aug. 3, 2017, the content of which is incorporated herein by reference in its entirety.

FIELD OF THE INVENTION

The invention relates to the manufacturing technology of rail vehicles, in particular to a connection structure and system of integrated brake device for a rail vehicle.

DESCRIPTION OF THE RELATED ART

Components of a brake system of a rail vehicle are connected with the rail vehicle body in a scattered manner, resulting in complex pipeline connection and occupation of a large space, which is unfavorable for maintenance. When designing a rolling stock, it is required to determine a mounting position of the brake system according to dimensions of the car body.

For the current rail vehicles, the brake systems including various types of air cylinders are mounted on fixed mounts. However, the fixed mounts require large spaces and are unfavorable for maintenance and disassembly of components.

SUMMARY OF THE INVENTION

A purpose of the invention is to provide a connection structure of an integrated brake device for a rail vehicle to address the problems. The connection structure has a simple and compact structure and saves on space. Brake components are integrated on an intermediate body, and connections between the brake components and between the whole integrated brake device and the rail vehicle body or any other external connection base are all secure and reliable, which improves the problems.

Another purpose of the invention is to provide a connection system of an integrated brake device for a rail vehicle. By arranging connections between the intermediate body and the brake components, the connection system improves connection stability of the brake components and connection security of a connection assembly, and reduces design weight of the integrated brake device.

The invention is realized as follows:

Embodiments of the invention provide a connection structure of an integrated brake device for a rail vehicle, comprising a brake valve, a dust collector, an intermediate body, an air cylinder, a support assembly and a connection assembly.

The intermediate body is of a plate-type structure, the brake valve and the dust collector are mounted on one side of the intermediate body, the air cylinder is mounted on the other side of the intermediate body, the air cylinder is connected to the intermediate body by means of the connection assembly, the support assembly is located between the air cylinder and the intermediate body, and the support assembly is mounted on the intermediate body.

Further, the intermediate body comprises an accommodating cavity, and pipelines in communication with the brake valve, the dust collector and the air cylinder are arranged inside the accommodating cavity.

Further, the support assembly is mounted on one side of the intermediate body far away from the brake valve, and the support assembly and the brake valve are located respectively on two opposite working faces of the intermediate body.

Further, the support assembly is fixedly connected with the intermediate body.

Further, the support assembly is fixedly connected with the intermediate body by means of a rivet.

Further, the support assembly comprises at least two supports, and the at least two supports are arranged side by side in the length direction of the intermediate body, the supports extend in the width direction of the intermediate body, the support are provided with two connecting holes respectively, and the two connecting holes are located at two ends of the support in the length direction of the support, the intermediate body is located between the two connecting holes, and the support is riveted with the intermediate body.

Further, the connection assembly comprises at least two U-shaped cylinder ferrules, two ends of the U-shaped cylinder ferrules are provided with a thread section respectively, the U-shaped cylinder ferrules are sleeved outside a side wall of the air cylinder, and the U-shaped cylinder ferrule is arranged inside the connecting hole in a penetrating manner and is fastened with the support by means of a first lock nut.

Further, the thread section comprises a first thread segment and a second thread segment, the first thread segment is arranged inside the connecting hole in a penetrating manner, the second thread segment is far away from the support relative to the first thread segment, the first thread segment is located between the second thread segment and the air cylinder, the first lock nut is located at and in fit with the first thread segment, and the second thread segment is locally damaged.

Further, the connection assembly further comprises a stop nut, the stop nut is in fit with the first lock nut and is configured to prevent the first lock nut from loosening and shedding.

Further, the stop nut is sleeved outside and in fit with the thread section, and the stop nut is located at one end of the first lock nut far away from the support.

Further, the connection assembly comprises at least two M-shaped connecting members, the M-shaped connecting member comprises two first connecting portions, a second connecting portion and two third connecting portions, the two first connecting portions are located at two ends of the M-shaped connecting member, and ends of the first connecting portion are fixedly connected with the air cylinder, the second connecting portion is located between the two first connecting portions, the second connecting portion is adhered to an external surface of the air cylinder and is fixedly connected with the air cylinder, the third connecting portion is located between the first connecting portion and the second connecting portion, and the third connecting portion is removably connected with the intermediate body.

Further, the first connecting portion and the second connecting portion are fixedly connected with the external surface of the air cylinder respectively.

Further, the third connecting portion is connected with the intermediate body by means of a connecting bolt, ends of the connecting bolt are provided with a second lock nut respectively, the connecting bolt comprises a third thread segment and a fourth thread segment, the second lock nut is sleeved on the third thread segment, the fourth thread segment is far away from the intermediate body relative to the third thread segment, and the fourth thread segment is locally damaged.

Further, one end of the second lock nut far away from the intermediate body is provided with a stop nut, and the stop nut is in fit with the second lock nut.

An embodiment of the invention also provides a connection system of an integrated brake device for a rail vehicle, comprising the connection structure of an integrated brake device for a rail vehicle.

Further, the connection system of an integrated brake device for a rail vehicle comprises a support mounting base, and the support mounting base is integrally formed with the support.

Further, at least four anti-shedding lifting hooks are arranged between the support mounting base and the rail vehicle body or any other connecting component.

Further, center of gravity of the integrated brake device is in the vertical direction of an area formed by sequentially connecting mounting holes located at periphery of the support mounting base in the connection assembly.

Compared with the prior art, the invention has the following beneficial effects:

The connection structure of an integrated brake device for a rail vehicle has a simple and compact structure and saves on space. Brake components are integrated on the intermediate body, and connections between the brake components and between the whole integrated brake device and the rail vehicle body or any other external connection base are all secure and reliable.

The connection system of an integrated brake device for a rail vehicle uses the connection structure of an integrated brake device for a rail vehicle. By arranging connections between the intermediate body and the brake components, the connection system improves connection stability of the brake components and connection security of a connection assembly, and reduces design weight of the integrated brake device.

BRIEF DESCRIPTION OF THE DRAWINGS

In order to describe technical solutions of the embodiments of the invention more clearly, drawings used in embodiments will be simply introduced below. It should be understood that the drawings described below only show some embodiments of the invention, and they shall not be construed as restriction to the scope. Those of ordinary skill in the art can obtain other drawings based on these drawings without creative work.

Figure 1:
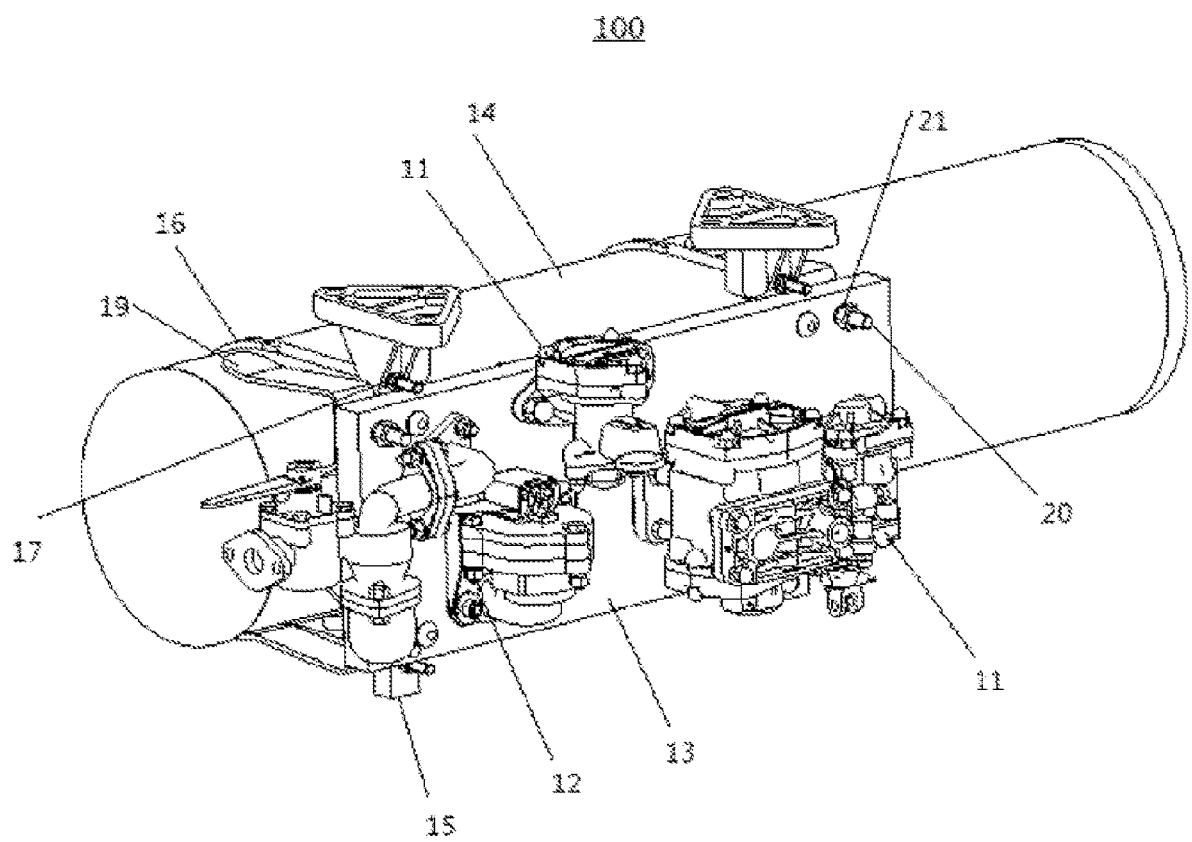
FIG. 1 is a structural diagram of the connection structure of an integrated brake device for a rail vehicle according to the first embodiment of the invention.

Marks in the figures, 100—connection structure of an integrated brake device for a rail vehicle; 11—brake valve; 12—dust collector; 13—intermediate body; 14—air cylinder; 15—support; 16—U-shaped cylinder ferrule; 161—first thread segment; 162—second thread segment; 17—first lock nut; 19—M-shaped connecting member; 191—first connecting portion; 192—second connecting portion; 193—third connecting portion; 20—connecting bolt; 201—third thread segment; 202—fourth thread segment; 21—second lock nut; 23—support mounting base; 24—anti-shedding lifting hook; 25—connecting component; 26—mounting hole.

DESCRIPTION OF THE PREFERRED EMBODIMENTS

The technical solutions of the embodiments of the invention will be described clearly and completely as follows in combination with the drawings of these embodiments for clear understanding of the purposes, technical solutions and advantages of the invention. Apparently, the embodiments described are only some embodiments of the invention, but not all embodiments. Generally, the components in the embodiments of the invention described and shown in the accompanied drawings herein can be arranged and designed in various configurations.

The detailed descriptions of the embodiments of the invention provided in the drawings are not intended to limit the scope of the invention, and the embodiments are only certain embodiments of the invention. Based on the embodiments of the invention, all other embodiments obtained by those of ordinary skill in the art without creative work fall within the protection scope of the invention.

It should be noted that similar marks and letters generally indicate the similar items. Therefore, once an item is defined in a drawing, this item is not necessarily further defined and explained in the subsequent drawings.

For description of the invention, it should be stated that orientation or position relations indicated by the terms "inside" and "outside" are based on the orientation or position relations shown in the drawings or the commonly arranged orientation or position relations as used in the invention, and they are used to describe the invention and simplify description herein instead of indicating or implying that the device or component indicated must have specific orientation and be constructed and operated in specific orientation. Therefore, the embodiments described herein shall not be construed as limitation hereto. Furthermore, the terms "first" and "second" are used to distinguish descriptions instead of being construed as indication or implication of relative importance.

For description of the invention, it should be stated that the terms "arranged" and "connection" should be understood in a board sense unless otherwise clearly specified and defined. For example, it may be a fixed connection, a removable connection or an integrated connection; it can be a mechanical connection or electrical indication; it can be direct connection or indirect connection through an intermediate, or it can be a communication inside two components. Those of ordinary skill in the art can understand the specific meaning of the terms in the invention according to actual conditions.

First Embodiment

By reference to FIG. 1, the embodiment provides a connection structure of an integrated brake device for a rail vehicle 100, comprising a brake valve 11, a dust collector 12, an intermediate body 13, an air cylinder 14, a support assembly and a connection assembly.

In the embodiment, the intermediate body 13 is of a plate-type structure, an accommodating cavity and a pipeline are arranged inside the intermediate body 13, and different types of brake valves 11 and dust collectors 12 are mounted on the same side of the intermediate body 13, so that the different types of brake valves 11 and dust collectors 12 are integrated on the intermediate body 13, which saves on space of the integrated brake device. The support assembly is mounted on one side of the intermediate body 13 far away from the brake valve 11, and the intermediate body 13 is removably connected with the air cylinder 14 by means of the connection assembly, which improves connection security and reliability of the intermediate body 13 and the air cylinder 14 and has anti-shedding function.

In this way, the scattered brake devices (at least comprising the brake valve 11, the dust collector 12 and the air cylinder 14) are capable of being conveniently integrated by means of the intermediate body 11, and then connected with a rail vehicle body or any other external connection base, thus greatly improving space occupancy rate of a vehicle brake system, facilitating maintenance of the brake device and the vehicle, and having significant economic benefits.

Below is the detailed description of specific structures and mutual position relations of components of the connection structure of an integrated brake device for a rail vehicle 100.

As shown in FIG. 1, the intermediate body 13 is of a plate-type structure, and the intermediate body 13 comprises an accommodating cavity, and multiple groups of pipelines are arranged inside the accommodating cavity. The accommodating cavity is arranged so that the pipelines are centralized in the accommodating cavity, which saves on space and improves space use ratio.

In the embodiment, different types of brake valves 11 and dust collectors 12 are integrated on the intermediate body 13, and the brake valves 11 and the dust collectors 12 are arranged at the same side of the intermediate body 13, and the brake valves 11 and the dust collectors 12 are in communication with the pipelines inside the intermediate body 13 respectively, thus the brake valves 11 and the dust collectors 12 are mounted in a centralized manner, further saving on space. The mounting positions of the brake valves 11 and the dust collectors 12 on the intermediate body 13 can be selected according to the pipelines arranged inside the intermediate body 12 in advance, and the user can select different mounting positions according to dimensions of different types of brake valves 11 and dust collectors 12.

Further, as shown in the figure, the support assembly is mounted on one side of the intermediate body 13 far away from the brake valve 11, that is, the support assembly and the brake valve 11 are located respectively on two opposite working faces of the intermediate body 13. The support assembly is configured to be connected with the rail vehicle body or an external connection base to facilitate fixation of the connection structure of an integrated brake device for a rail vehicle 100 on the rail vehicle body or any other external connection base.

It should be noted that the support assembly can be fixedly or removably connected with the intermediate body 13, and the user can selected different connection methods according to actual situation.

Further, when the support assembly is removably connected with the intermediate body 13, the support assembly can be removed and separated from the intermediate body 13 conveniently and can be replaced at any time; and when the support assembly is fixedly connected with the intermediate body 13, the connection security and stability of the support assembly and the intermediate body are guaranteed, and connection strength of the support assembly and the intermediate body 13 is improved.

Alternatively, the support assembly is fixedly connected with the intermediate body 13 by means of a rivet. The support assembly also can be fixedly with the intermediate body 13 by means of welding. Compared with other connection methods, the support assembly is riveted with the intermediate body 13 at a connection point selected according to actual situation. To separate the support assembly from the intermediate body 13, the user can damage the riveting point with a little damaged connection face, which has a little impact on the intermediate body 13.

Further, the support assembly comprises at least two supports 15, the at least two supports 15 are arranged side by side in the length direction of the intermediate body 13, the supports 15 extend in the width direction of the intermediate body 13, and the supports 15 are riveted with two ends of the intermediate body 13 by a fast fixation method. The support 15 is provided with two connecting holes respectively, and the two connecting holes are located at two ends of the support in the length direction of the support 15, and the intermediate body 13 is located between the two connecting holes. There can be a plurality of supports 15, and the user can select different number of supports according to actual situation.

Figure 2:
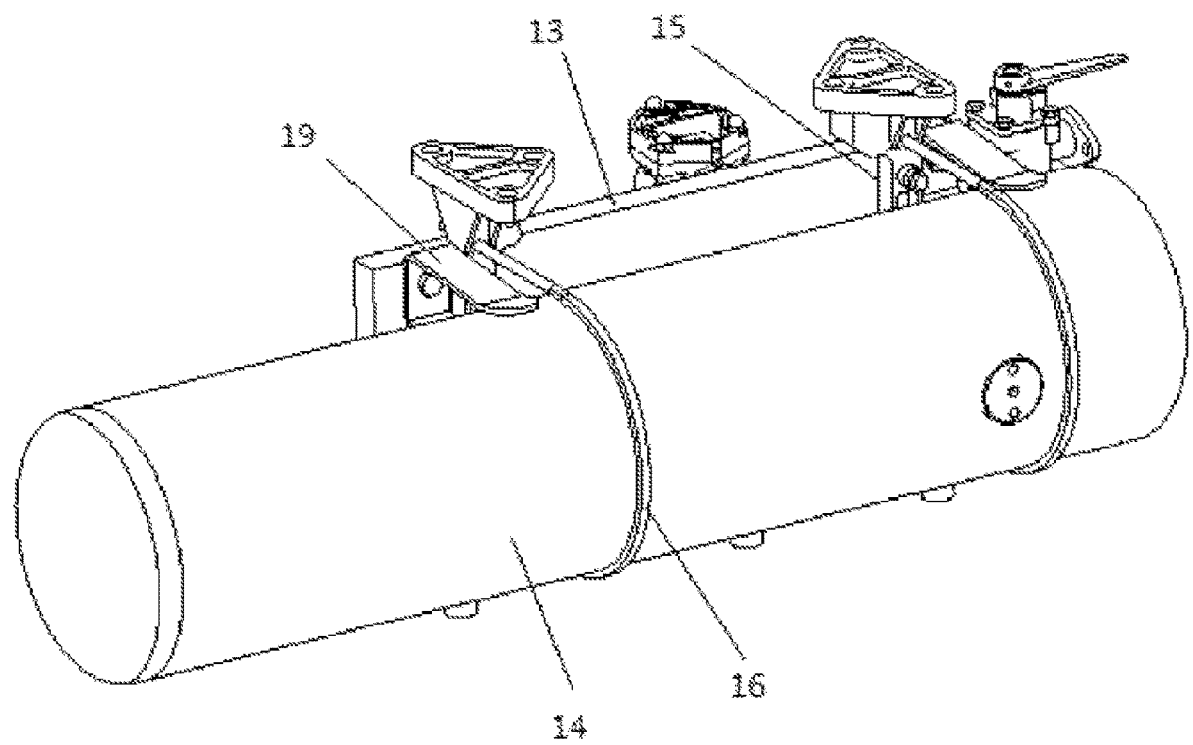
FIG. 2 is a structural diagram of the connection assembly shown in FIG. 1.
Figure 3:
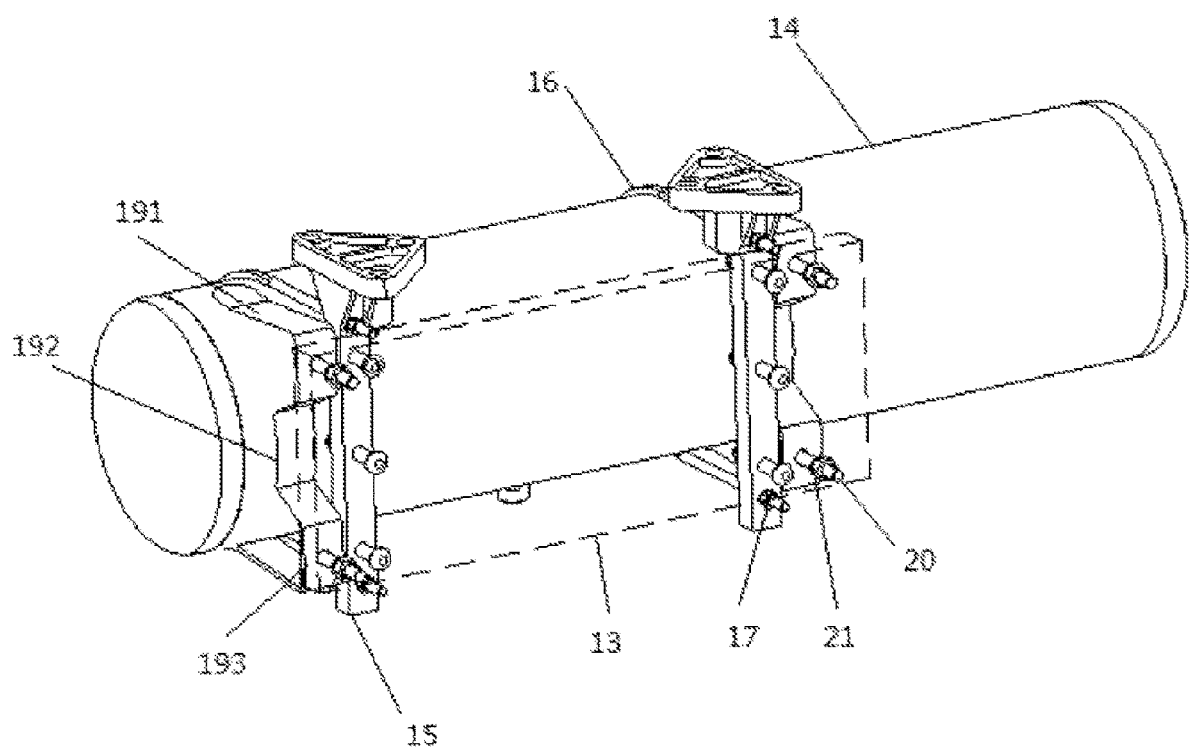
FIG. 3 is a structural diagram of the M-shaped connecting member shown in FIG. 1.

FIG. 2 is a structural diagram of the connection assembly in FIG. 1, and FIG. 3 is a structural diagram of the M-shaped connecting member in FIG. 1.

By reference to FIG. 1 to FIG. 3, in the embodiment, the support assembly comprises two supports, the two supports are arranged side by side in the length direction of the intermediate body 13, and the supports 15 arranged symmetrically can improve the connection stability of the supports 15 and the intermediate body 13, saves on space and realize reasonable use of structural space.

It should be noted that to clearly show structure of the back of the intermediate body 13 (one side of the intermediate body 13 far away from the brake valve 11, the intermediate body 13 is hidden in FIG. 3. The air cylinder 14 is configured to provide power for the brake valves 11. The air cylinder 14 is removably connected with the intermediate body 13 by means of the connection assembly, and the support assembly is located between the air cylinder 14 and the intermediate body 13, that is, the supports 15 are arranged to face the air cylinder 14. The air cylinder 14 and the brake valve 11 are respectively located at two sides of the intermediate body 13, and the air cylinder 14 is in communication with the pipelines in the intermediate body 13. In the embodiment, the connection assembly comprises at least two U-shaped cylinder ferrules 16, and the U-shaped cylinder ferrules 16 are arranged to correspond to the supports 15. Two ends of the U-shaped cylinder ferrule 16 are provided with a thread section respectively, the U-shaped cylinder ferrule 16 is sleeved outside a side wall of the air cylinder 14, and the U-shaped cylinder ferrule 16 is arranged inside the connecting hole in a penetrating manner and is fastened with the support 15 by means of a first lock nut 17.

Further, to prevent the first lock nut 17 from loosening and shedding in service, the connection assembly further comprises a stop nut, the stop nut is sleeved outside and in fit with the thread section, and the stop nut is located at one end of the first lock nut 17 far away from the support 15.

Also by reference to FIG. 1 to FIG. 3, the connection assembly further comprises at least two M-shaped connecting members 19, the M-shaped connecting member 19 comprises two first connecting portions 191, a second connecting portion 192 and two third connecting portions 193. The two first connecting portions 191 are located at two ends of the M-shaped connecting member 19, and ends of the first connecting portion 191 are fixedly connected with the air cylinder 14; the second connecting portion 192 is located between the two first connecting portions 191, that is, the second connecting portion 192 is located at center of the M-shaped connecting member 19, and the second connecting portion 192 is adhered to an external surface of the air cylinder 14 and is fixedly connected with the air cylinder 14; and the third connecting portion 193 is located between the first connecting portion 191 and the second connecting portion 192, and the third connecting portion 193 is removably connected with the intermediate body 13.

Alternatively, the first connecting portion 191 and the second connecting portion 192 are welded to the external surface of the air cylinder 14 respectively, that is, the first connecting portion 191 and the second connecting portion 192 are fixedly connected with the air cylinder 14 for fixation. The third connecting portion 193 is connected with the intermediate body 13, so that the intermediate body 13 is fixed in relation to the intermediate body 13 and not movable in relation to the air cylinder 14.

Further, the third connecting portion 193 is connected with the intermediate body 13 by means of a connecting bolt 20, ends of the connecting bolt 20 are provided with a second lock nut 21 respectively, and the second lock nut 21 is in fit with the connecting bolt 20, so that the intermediate body 13 is fastened with the third connecting portion 193. To facilitate connection and removal of the intermediate body 13, the connecting bolt 20 is arranged in the intermediate body 13 in a penetrating manner toward a direction far away from the air cylinder 14.

Optionally, to prevent the second lock nut 21 from loosening and shedding, an end of the second lock nut 21 far away from the intermediate body 13 is provided with a stop nut, and the stop nut is in fit with the second lock nut 21.

The embodiment of the invention operates according to the following principle:

In use, different types of brake valves 11 and dust collectors 12 are integrated on the face of the intermediate body, thus having a simple and compact structure and saving on space; and the supports 15 are mounted on the back of the plate-type immediate body 13 and riveted with the intermediate body 13 by means of rivets, thus the supports 15 are reliably and safely connected with the plate-type intermediate body 13. The air cylinder 14 is connected with the supports 15 by means of the U-shaped cylinder ferrules 16, so that the air cylinder 14 and the intermediate body 13 are steadily mounted with anti-shedding function.

In such a manner, the pipeline connection is simplified, and the space is saved on, which are favorable for maintenance of the equipment. When designing a rolling stock, it is required to determine a mounting position of the brake system according to dimensions of the car body. And when in use, it is not necessary to determine the mounting position of the brake system according to the dimensions of the car body.

Second Embodiment

Figure 4:
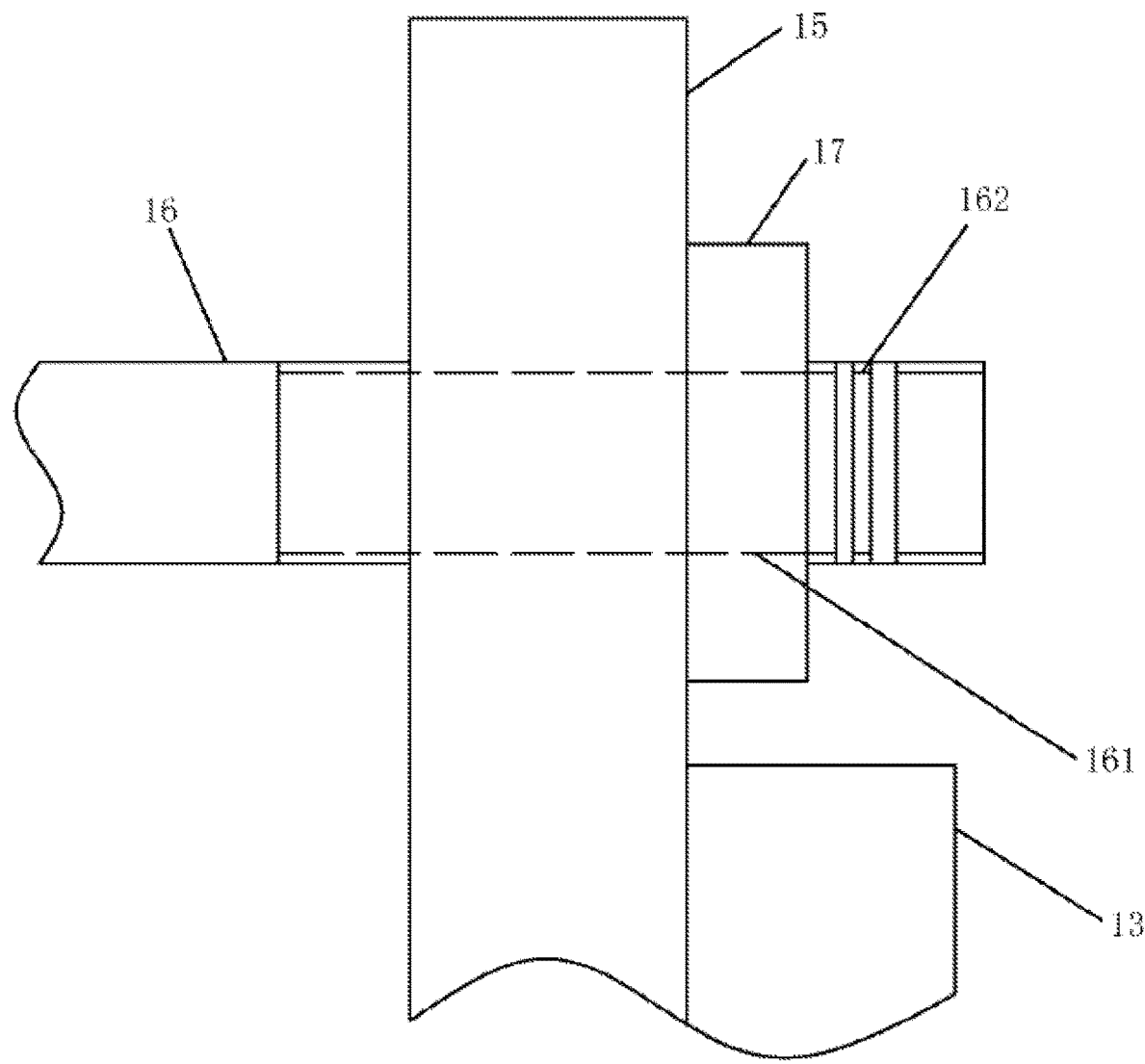
FIG. 4 is a structural diagram of the thread section of the U-shaped cylinder ferrule of the connection structure of an integrated brake device for a rail vehicle according to the second embodiment of the invention.

Through researches, the researchers can make the following optional structural scheme for the connection structure of an integrated brake device for a rail vehicle of the invention based on the first embodiment, and the structural scheme is explained as follows:

FIG. 4 is a structural diagram of the thread section of the U-shaped cylinder ferrule of the connection structure of an integrated brake device for a rail vehicle 10 according to the second embodiment of the invention.

By reference to FIG. 4, the thread section of the U-shaped cylinder ferrule 16 comprises a first thread segment 161 and a second thread segment 162, the first thread segment 161 is arranged inside the connecting hole in a penetrating manner, and the second thread segment 162 is far away from the supports relative to the first thread segment 161, that is, the second thread segment 162 is located at the end of the U-shaped cylinder ferrule 16, and the first thread segment 161 is located between the second thread segment 162 and the air cylinder 14. The first lock nut 17 is located at the first thread segment 161, the first lock nut 17 is in fit with the first thread segment 161, and the second thread segment 162 is locally damaged.

It should be noted that the second thread segment 162 is arranged close to the intermediate body 13, and the damaged thread is configured to prevent the first lock nut 17 from loosening and shedding due to shock, thus having good connection security and reliability.

Figure 5:
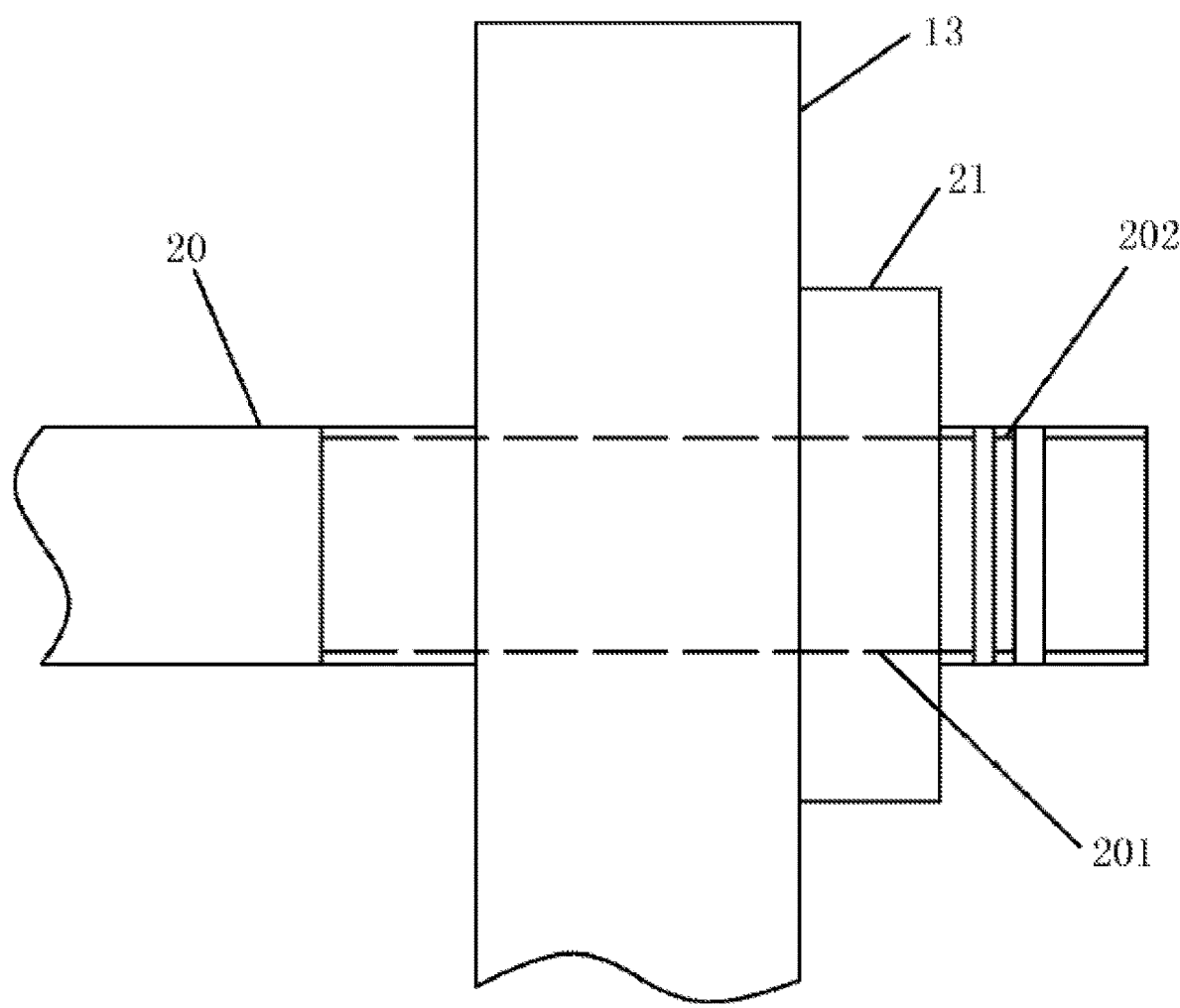
FIG. 5 is a structural diagram of the thread segment of the connecting bolt of the connection structure of an integrated brake device for a rail vehicle according to the second embodiment of the invention.

FIG. 5 is a structural diagram of the thread segment of the connecting bolt 20 of the connection structure of an integrated brake device for a rail vehicle 100 according to the second embodiment of the invention.

By reference to FIG. 5, the connecting bolt 20 comprises a third thread segment 201 and a fourth thread segment 202, the second lock nut 21 is sleeved on the third thread segment 201, the fourth thread segment 202 is far away from the intermediate body 13 relative to the third segment 201, and the fourth thread segment 202 is locally damaged.

It should be noted that the fourth thread segment 202 is arranged close to the intermediate body 13, and the damaged thread is configured to prevent the second lock nut 21 from loosening and shedding due to shock, thus having good connection security and reliability.

In relative to the stop function of the stop nut, the thread damage can prevent the first lock nut 17 or the second lock nut 21 from loosening and shedding, thus improving the connection stability and security of the air cylinder 14 and the intermediate body 13.

Third Embodiment

The embodiment of the invention provides a connection system of an integrated brake device for a rail vehicle, comprising the connection structure of an integrated brake device for a rail vehicle 100 of the above embodiments.

Figure 6:
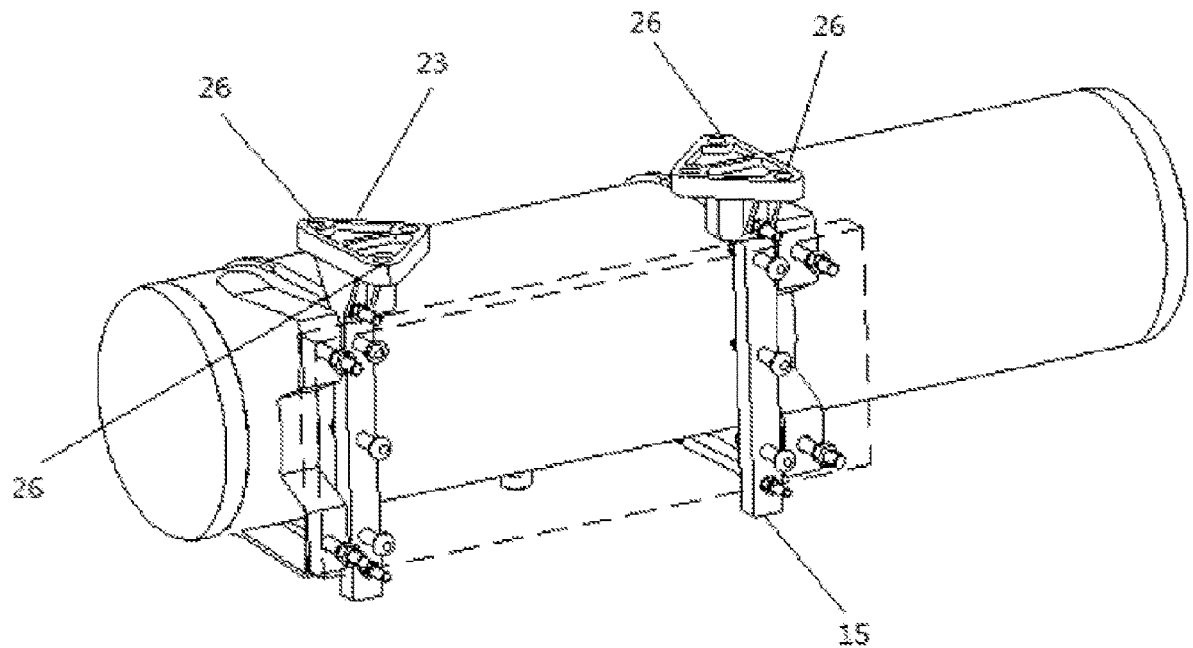
FIG. 6 is a structural diagram of the connection system of an integrated brake device for a rail vehicle according to the third embodiment of the invention.

FIG. 6 is a structural diagram of the connection system of an integrated brake device for a rail vehicle according to the third embodiment of the invention.

By reference to FIG. 6, it can be seen that in the embodiment, in order to facilitate connection between the connection structure of an integrated brake device for a rail vehicle and a rail vehicle body or any other connecting component 25, the connection system of an integrated brake device for a rail vehicle comprises a support mounting base 23, and the support mounting base 23 is integrated with the support 15.

Figure 7:
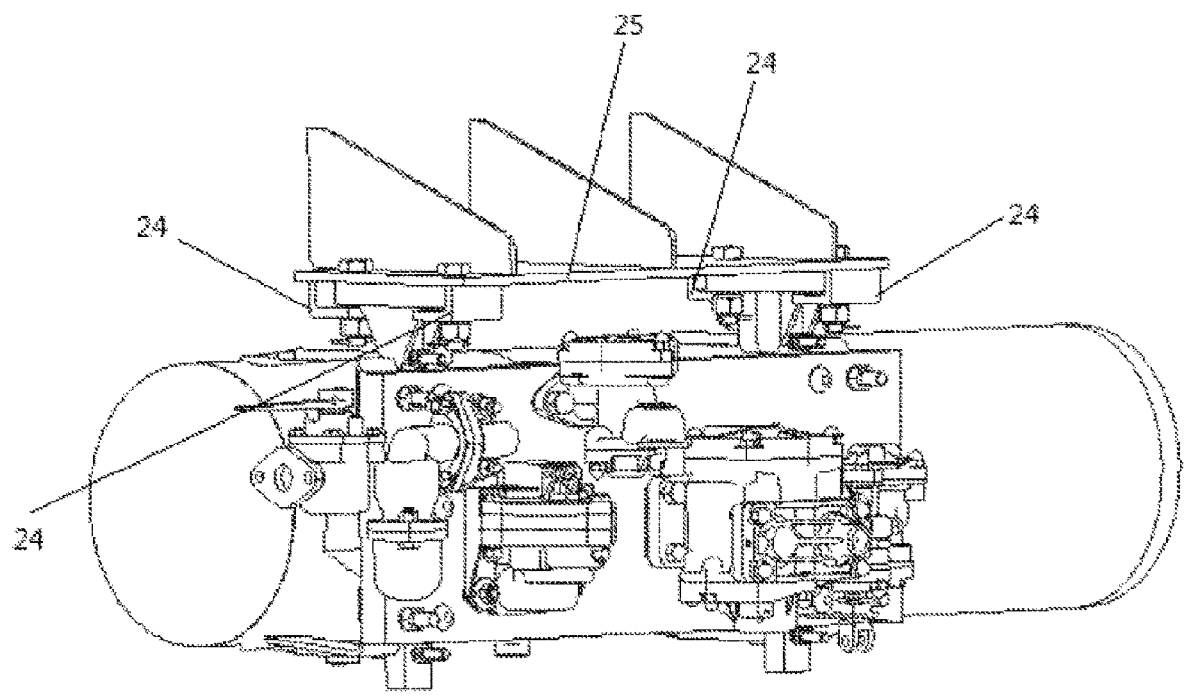
FIG. 7 is another structural diagram of the connection system of an integrated brake device for a rail vehicle according to the third embodiment of the invention.

FIG. 7 is another structural diagram of the connection system of an integrated brake device for a rail vehicle according to the third embodiment of the invention. As shown in FIG. 7, when the connection structure of an integrated brake device for a rail vehicle 100 is connected with a rail vehicle body or any other connecting component 25, at least four anti-shedding lifting hooks 24 are arranged between the support mounting base 23 and the rail vehicle body or the other connecting component 25, so that the connection of the connection structure of an integrated brake device for a rail vehicle 100 is additional provided with an anti-shedding function, improving security.

For the connection system of an integrated brake device for a rail vehicle using the connection structure of an integrated brake device for a rail vehicle 100, by arranging connections between the intermediate body 13 and the brake components, center of gravity of the integrated brake device is in the vertical direction of an area formed by sequentially connecting the mounting holes 26 located at periphery of the support mounting base 23 in the connection assembly, thus reducing extra force of loosening and shedding and torque on the connection fasteners and brake components resulting from frequent vibration during operation of the rail vehicle, improving connection stability of the brake components, enhancing connection security of the connection assembly, and reducing design weight of the integrated brake device.

It should be noted that the features of the embodiments of the invention can be combined without any conflict.

The embodiments are only preferred embodiments of the invention, but not limit thereto. For a person skilled in the art, various variations and changes can be made to the invention. Any modification, equivalent replacement and improvement made within the spirit and rule of the invention shall be incorporated in the protection scope of the invention.

INDUSTRIAL APPLICABILITY

The connection structure of an integrated brake device for a rail vehicle according to the embodiments of the invention is capable of integrating the brake components on the intermediate body, and the connections between the brake components and between the whole integrated brake device and the rail vehicle body or any other external connection base are all secure and reliable, which facilitates maintenance.

The connection system of an integrated brake device for a rail vehicle of the embodiment of the invention uses the connection structure of an integrated brake device for a rail vehicle. By arranging the connections between the intermediate body and the brake components, the connection system improves connection stability of the brake components and connection security of the connection assembly, and reduces design weight of the integrated brake device.

The invention claimed is:

1. A connection structure of an integrated brake device for a rail vehicle, characterized by comprising a brake valve, a dust collector, an intermediate body, an air cylinder, a support assembly and a connection assembly;
wherein the intermediate body is of a plate-type structure, the brake valve and the dust collector are mounted on one side of the intermediate body, the air cylinder is mounted on the other side of the intermediate body, the air cylinder is connected to the intermediate body by means of the connection assembly, the support assembly is located between the air cylinder and the intermediate body, and the support assembly is mounted on the intermediate body.

2. The connection structure of an integrated brake device for a rail vehicle of claim 1, characterized in that the intermediate body comprises an accommodating cavity, and pipelines in communication with the brake valve, the dust collector and the air cylinder are arranged inside the accommodating cavity.

3. The connection structure of an integrated brake device for a rail vehicle of claim 1, characterized in that the support assembly is mounted on one side of the intermediate body far away from the brake valve, and the support assembly and the brake valve are located respectively on two opposite working faces of the intermediate body.

4. The connection structure of an integrated brake device for a rail vehicle of claim 1, characterized in that the support assembly is fixedly connected with the intermediate body.

5. The connection structure of an integrated brake device for a rail vehicle of claim 4, characterized in that the support assembly is fixedly connected with the intermediate body by means of a rivet.

6. The connection structure of an integrated brake device for a rail vehicle of claim 1, characterized in that the support assembly comprises at least two supports, and the at least two supports are arranged side by side in the length direction of the intermediate body, the supports extend in the width direction of the intermediate body, the support are provided with two connecting holes respectively, and the two connecting holes are located at two ends of the support in the length direction of the support, the intermediate body is located between the two connecting holes, and the support is riveted with the intermediate body.

7. The connection structure of an integrated brake device for a rail vehicle of claim 6, characterized in that the connection assembly comprises at least two U-shaped cylinder ferrules, two ends of the U-shaped cylinder ferrules are provided with a thread section respectively, the U-shaped cylinder ferrules are sleeved outside a side wall of the air cylinder, and the U-shaped cylinder ferrule is arranged in the connecting hole in a penetrating manner and is fastened with the support by means of a first lock nut.

8. The connection structure of an integrated brake device for a rail vehicle of claim 7, characterized in that the thread section comprises a first thread segment and a second thread segment, the first thread segment is arranged in the connecting hole in a penetrating manner, the second thread segment is far away from the support relative to the first thread segment, the first thread segment is located between the second thread segment and the air cylinder, the first lock nut is located at and in fit with the first thread segment, and the second thread segment is locally damaged.

9. The connection structure of an integrated brake device for a rail vehicle of claim 7, characterized in that the connection assembly further comprises a stop nut, the stop nut is in fit with the first lock nut and is configured to prevent the first lock nut from loosening and shedding.

10. The connection structure of an integrated brake device for a rail vehicle of claim 9, characterized in that the stop nut is sleeved outside and in fit with the thread section, and the stop nut is located at one end of the first lock nut far away from the support.

11. The connection structure of an integrated brake device for a rail vehicle of claim 7, characterized in that the connection assembly comprises at least two M-shaped connecting members, the M-shaped connecting member comprises two first connecting portions, a second connecting portion and two third connecting portions, the two first connecting portions are located at two ends of the M-shaped connecting member, and ends of the first connecting portion are fixedly connected with the air cylinder, the second connecting portion is located between the two first connecting portions, the second connecting portion is adhered to an external surface of the air cylinder and is fixedly connected with the air cylinder, the third connecting portion is located between the first connecting portion and the second connecting portion, and the third connecting portion is removably connected with the intermediate body.

12. The connection structure of an integrated brake device for a rail vehicle of claim 11, characterized in that the first connecting portion and the second connecting portion are fixedly connected with the external surface of the air cylinder respectively.

13. The connection structure of an integrated brake device for a rail vehicle of claim 11, characterized in that the third connecting portion is connected with the intermediate body by means of a connecting bolt, ends of the connecting bolt are provided with a second lock nut respectively, the connecting bolt comprises a third thread segment and a fourth thread segment, the second lock nut is sleeved on the third thread segment, the fourth thread segment is far away from the intermediate body relative to the third thread segment, and the fourth thread segment is locally damaged.

14. The connection structure of an integrated brake device for a rail vehicle of claim 13, characterized in that one end of the second lock nut far away from the intermediate body is provided with a stop nut, and the stop nut is in fit with the second lock nut.

15. A connection system of an integrated brake device for a rail vehicle, characterized by comprising the connection structure of an integrated brake device for a rail vehicle of claim 1.

16. The connection system of an integrated brake device for a rail vehicle of claim 15, characterized in that the connection system comprises a support mounting base, and the support mounting base is integrally formed with the support.

17. The connection system of an integrated brake device for a rail vehicle of claim 16, characterized in that at least four anti-shedding lifting hooks are arranged between the support mounting base and the rail vehicle body or any other connecting component.

18. The connection system of an integrated brake device for a rail vehicle of claim 16, characterized in that center of gravity of the integrated brake device is in the vertical direction of an area formed by sequentially connecting mounting holes located at periphery of the support mounting base in the connection assembly.

* * * * *